United States Patent
Gangloor et al.

(10) Patent No.: US 9,734,200 B2
(45) Date of Patent: Aug. 15, 2017

(54) IDENTIFYING HIGH RISK DATABASE STATEMENTS IN CHANGING DATABASE ENVIRONMENTS

(71) Applicant: Oracle International Corporation, Redwood Shores, CA (US)

(72) Inventors: Prabhaker Gangloor, San Jose, CA (US); Mughees Minhas, Palo Alto, CA (US); Khaled Yagoub, Newark, CA (US); Waleed Ahmed, Decatur, GA (US)

(73) Assignee: Oracle International Corporation, Redwood Shores, CA (US)

( * ) Notice: Subject to any disclaimer, the term of this patent is extended or adjusted under 35 U.S.C. 154(b) by 220 days.

(21) Appl. No.: 14/270,556

(22) Filed: May 6, 2014

(65) Prior Publication Data

US 2015/0324432 A1 Nov. 12, 2015

(51) Int. Cl.
*G06F 7/00* (2006.01)
*G06F 17/30* (2006.01)

(52) U.S. Cl.
CPC .. *G06F 17/30463* (2013.01); *G06F 17/30477* (2013.01); *G06F 17/30536* (2013.01); *G06F 17/30864* (2013.01)

(58) Field of Classification Search
CPC ......... G06F 17/30477; G06F 17/30675; G06F 17/30938; G06F 17/30306; G06F 17/30536; G06F 17/30864
USPC .................. 707/718, 719, 720, 713, 999.002
See application file for complete search history.

(56) References Cited

U.S. PATENT DOCUMENTS

| | | | |
|---|---|---|---|
| 4,769,772 | A | 9/1988 | Dwyer |
| 4,803,614 | A | 2/1989 | Banba et al. |
| 4,829,427 | A | 5/1989 | Green |
| 4,956,774 | A | 9/1990 | Shibamiya et al. |
| 5,091,852 | A | 2/1992 | Tsuchida et al. |

(Continued)

OTHER PUBLICATIONS

Dageville et al., "Automatic SQL Tuning in Oracle 10g", in Proceedings of the Thirteenth International Conference on Very Large Databases, vol. 30, dated 2004, 12 pages.

(Continued)

*Primary Examiner* — Mohammed R Uddin
(74) *Attorney, Agent, or Firm* — Hickman Palermo Becker Bingham LLP

(57) ABSTRACT

High-risk database statements are identified. A DBMS performs a series of experiments by generating sets of statistics describing data over which particular database statements run. The DBMS submits each of these sets of statistics to a query optimizer, which returns information for an execution plan that the optimizer would use to implement the statements given the submitted set of data statistics. If the DBMS determines that the optimizer changes the established execution plan for the database statements for any of the submitted sets of statistics, the DBMS performs one or more actions to mitigate the risk of changing execution plans, such as automatically tuning the database statements or the entire workload, and/or sending information about the database statements to a database administrator. Techniques are also described for calculating diagnostic values based on the results of such experiments, which quantify the sensitivity of the execution plans to changes in data statistics.

16 Claims, 5 Drawing Sheets

(56) References Cited

U.S. PATENT DOCUMENTS

| | | |
|---|---|---|
| 5,251,131 A | 10/1993 | Masand et al. |
| 5,287,459 A | 2/1994 | Gniewek |
| 5,301,317 A | 4/1994 | Lohman et al. |
| 5,315,580 A | 5/1994 | Phaal |
| 5,325,525 A | 6/1994 | Shan et al. |
| 5,339,429 A | 8/1994 | Tanaka et al. |
| 5,379,424 A | 1/1995 | Morimoto et al. |
| 5,412,804 A | 5/1995 | Krishna |
| 5,412,806 A | 5/1995 | Du et al. |
| 5,444,820 A | 8/1995 | Tzes et al. |
| 5,452,468 A | 9/1995 | Peterson |
| 5,459,837 A | 10/1995 | Caccavale |
| 5,469,560 A | 11/1995 | Beglin |
| 5,495,419 A | 2/1996 | Rostoker et al. |
| 5,495,606 A | 2/1996 | Borden et al. |
| 5,504,894 A | 4/1996 | Ferguson et al. |
| 5,537,588 A | 7/1996 | Engelmann et al. |
| 5,551,027 A | 8/1996 | Choy et al. |
| 5,572,640 A | 11/1996 | Schettler |
| 5,574,900 A | 11/1996 | Huang et al. |
| 5,590,319 A | 12/1996 | Cohen et al. |
| 5,642,515 A | 6/1997 | Jones et al. |
| 5,671,403 A | 9/1997 | Shekita et al. |
| 5,675,791 A | 10/1997 | Bhide et al. |
| 5,680,547 A | 10/1997 | Chang |
| 5,694,591 A | 12/1997 | Du et al. |
| 5,710,915 A | 1/1998 | McElhiney |
| 5,761,654 A | 6/1998 | Tow |
| 5,764,912 A | 6/1998 | Rosborough |
| 5,765,150 A | 6/1998 | Burrows |
| 5,787,251 A | 7/1998 | Hamilton et al. |
| 5,794,227 A | 8/1998 | Brown |
| 5,797,136 A | 8/1998 | Boyer et al. |
| 5,822,748 A | 10/1998 | Cohen et al. |
| 5,852,820 A | 12/1998 | Burrows |
| 5,857,180 A | 1/1999 | Hallmark et al. |
| 5,860,069 A | 1/1999 | Wright |
| 5,875,445 A | 2/1999 | Antonshenkov |
| 5,918,225 A | 6/1999 | White et al. |
| 6,002,669 A | 12/1999 | White |
| 6,003,022 A | 12/1999 | Eberhard et al. |
| 6,009,265 A | 12/1999 | Huang et al. |
| 6,026,390 A | 2/2000 | Ross et al. |
| 6,026,391 A | 2/2000 | Osborn et al. |
| 6,026,394 A | 2/2000 | Tsuchida et al. |
| 6,061,676 A | 5/2000 | Srivastava et al. |
| 6,205,451 B1 | 3/2001 | Norcott et al. |
| 6,223,171 B1 * | 4/2001 | Chaudhuri .......... G06F 11/3447 707/718 |
| 6,289,335 B1 | 9/2001 | Downing et al. |
| 6,298,342 B1 | 10/2001 | Graefe et al. |
| 6,334,128 B1 | 12/2001 | Norcott et al. |
| 6,339,768 B1 | 1/2002 | Leung et al. |
| 6,353,826 B1 | 3/2002 | Seputis |
| 6,356,889 B1 | 3/2002 | Lohman et al. |
| 6,356,891 B1 | 3/2002 | Agrawal et al. |
| 6,363,371 B1 * | 3/2002 | Chaudhuri ........ G06F 17/30463 |
| 6,366,901 B1 * | 4/2002 | Ellis ................. G06F 17/30433 |
| 6,370,524 B1 | 4/2002 | Witkowski |
| 6,430,550 B1 | 8/2002 | Leo et al. |
| 6,438,558 B1 | 8/2002 | Stegelmann |
| 6,438,562 B1 | 8/2002 | Gupta et al. |
| 6,526,526 B1 | 2/2003 | Dong et al. |
| 6,529,896 B1 | 3/2003 | Leung et al. |
| 6,529,901 B1 * | 3/2003 | Chaudhuri ........ G06F 17/30463 |
| 6,598,038 B1 | 7/2003 | Guay et al. |
| 6,615,222 B2 | 9/2003 | Hornibrook et al. |
| 6,684,203 B1 | 1/2004 | Waddington et al. |
| 6,694,306 B1 | 2/2004 | Nishizawa et al. |
| 6,807,546 B2 | 10/2004 | Young-Lai |
| 6,901,405 B1 | 5/2005 | McCrady et al. |
| 6,934,699 B1 | 8/2005 | Haas et al. |
| 6,941,360 B1 | 9/2005 | Srivastava et al. |
| 6,954,776 B1 | 10/2005 | Cruanes et al. |
| 6,961,729 B1 | 11/2005 | Toohey et al. |
| 6,980,988 B1 | 12/2005 | Demers et al. |
| 6,990,503 B1 | 1/2006 | Luo et al. |
| 7,007,007 B2 | 2/2006 | Slutz |
| 7,089,225 B2 | 8/2006 | Li et al. |
| 7,139,749 B2 | 11/2006 | Bossman et al. |
| 7,155,428 B1 | 12/2006 | Brown et al. |
| 7,155,459 B2 | 12/2006 | Chaudhuri et al. |
| 7,185,000 B1 | 2/2007 | Brown et al. |
| 7,194,452 B2 | 3/2007 | Galindo-Legaria et al. |
| 7,234,112 B1 | 6/2007 | Brown et al. |
| 7,246,108 B2 | 7/2007 | Ahmed |
| 7,305,410 B2 | 12/2007 | Skopec et al. |
| 7,337,169 B2 | 2/2008 | Galindo-Legaria et al. |
| 7,383,247 B2 | 6/2008 | Li et al. |
| 7,406,477 B2 | 7/2008 | Farrar et al. |
| 7,499,907 B2 | 3/2009 | Brown et al. |
| 7,526,508 B2 | 4/2009 | Tan et al. |
| 7,634,459 B1 * | 12/2009 | Eshet ................. G06F 17/30306 |
| 7,647,293 B2 | 1/2010 | Borwn et al. |
| 7,664,730 B2 | 2/2010 | Ziauddin et al. |
| 7,747,606 B2 | 6/2010 | Dageville et al. |
| 7,797,286 B2 * | 9/2010 | Sauermann ....... G06F 17/30595 707/688 |
| 7,805,411 B2 | 9/2010 | Ziauddin et al. |
| 7,890,491 B1 | 2/2011 | Simmen |
| 7,966,313 B2 | 6/2011 | Bruno et al. |
| 7,970,755 B2 | 6/2011 | Belknap et al. |
| 8,019,750 B2 | 9/2011 | Kosciusko et al. |
| 8,180,762 B2 | 5/2012 | Steinbach et al. |
| 8,386,450 B2 | 2/2013 | Simmen |
| 8,898,142 B2 * | 11/2014 | Al-Omari ..................... 707/713 |
| 9,213,740 B2 * | 12/2015 | Andrei ............. G06F 17/30442 |
| 2001/0047372 A1 | 11/2001 | Gorelik et al. |
| 2002/0038313 A1 | 3/2002 | Klein et al. |
| 2002/0099521 A1 | 7/2002 | Yang et al. |
| 2002/0138376 A1 | 9/2002 | Hinkle |
| 2002/0188600 A1 | 12/2002 | Lindsay et al. |
| 2003/0033291 A1 | 2/2003 | Harris |
| 2003/0065644 A1 | 4/2003 | Horman et al. |
| 2003/0088541 A1 | 5/2003 | Zilio et al. |
| 2003/0093408 A1 | 5/2003 | Brown et al. |
| 2003/0115212 A1 | 6/2003 | Hornibrook et al. |
| 2003/0135480 A1 | 7/2003 | Van Arsdale et al. |
| 2003/0159136 A1 | 8/2003 | Huang et al. |
| 2003/0182276 A1 * | 9/2003 | Bossman .......... G06F 17/30306 |
| 2003/0212647 A1 | 11/2003 | Bangel et al. |
| 2003/0212668 A1 | 11/2003 | Hinshaw et al. |
| 2003/0229639 A1 | 12/2003 | Carlson et al. |
| 2004/0003004 A1 | 1/2004 | Chaudhuri et al. |
| 2004/0015600 A1 | 1/2004 | Tiwary et al. |
| 2004/0039729 A1 * | 2/2004 | Boger ................ G06F 17/30463 |
| 2004/0181521 A1 | 9/2004 | Simmen |
| 2004/0205062 A1 | 10/2004 | Brown et al. |
| 2004/0220911 A1 | 11/2004 | Zuzarte et al. |
| 2004/0243555 A1 * | 12/2004 | Bolsius ............. G06F 17/30471 |
| 2004/0244031 A1 | 12/2004 | Martinez |
| 2005/0028134 A1 | 2/2005 | Zane et al. |
| 2005/0055382 A1 | 3/2005 | Ferrat et al. |
| 2005/0086195 A1 | 4/2005 | Tan et al. |
| 2005/0120000 A1 | 6/2005 | Ziauddin et al. |
| 2005/0125393 A1 | 6/2005 | Yagoub et al. |
| 2005/0125427 A1 | 6/2005 | Dageville et al. |
| 2005/0125452 A1 | 6/2005 | Ziauddin et al. |
| 2005/0138015 A1 | 6/2005 | Dageville et al. |
| 2005/0149505 A1 * | 7/2005 | Bossman .......... G06F 17/30536 |
| 2005/0165741 A1 | 7/2005 | Gordon |
| 2005/0177557 A1 | 8/2005 | Ziauddin et al. |
| 2005/0177971 A1 | 8/2005 | Porco |
| 2005/0187917 A1 | 8/2005 | Lawande et al. |
| 2005/0198013 A1 | 9/2005 | Cunningham et al. |
| 2005/0203933 A1 | 9/2005 | Chaudhuri et al. |
| 2005/0203940 A1 | 9/2005 | Farrar et al. |
| 2005/0234965 A1 | 10/2005 | Rozenshtein et al. |
| 2005/0262060 A1 | 11/2005 | Rohwedder et al. |
| 2005/0267866 A1 * | 12/2005 | Markl ............... G06F 17/30463 |
| 2005/0278357 A1 | 12/2005 | Brown et al. |
| 2005/0278577 A1 | 12/2005 | Doong et al. |
| 2005/0283458 A1 | 12/2005 | Galindo-Legaria et al. |
| 2005/0283471 A1 | 12/2005 | Ahmed |

(56) References Cited

U.S. PATENT DOCUMENTS

| | | |
|---|---|---|
| 2006/0026115 A1 | 2/2006 | Ahmed |
| 2006/0026133 A1 | 2/2006 | Ahmed |
| 2006/0031189 A1* | 2/2006 | Muras ............... G06F 17/30536 |
| 2006/0031200 A1 | 2/2006 | Santosuosso |
| 2006/0036989 A1* | 2/2006 | Chaudhuri ........ G06F 17/30312 717/101 |
| 2006/0041537 A1 | 2/2006 | Ahmed |
| 2006/0074874 A1* | 4/2006 | Day ................... G06F 17/30463 |
| 2006/0085378 A1 | 4/2006 | Raizman et al. |
| 2006/0085484 A1 | 4/2006 | Raizman et al. |
| 2006/0106839 A1* | 5/2006 | Shen ................. G06F 17/30463 |
| 2006/0129542 A1 | 6/2006 | Hinshaw et al. |
| 2006/0167914 A1* | 7/2006 | Faunce .............. G06F 17/30442 |
| 2006/0195416 A1 | 8/2006 | Ewen et al. |
| 2006/0212428 A1 | 9/2006 | Nelson |
| 2006/0218123 A1 | 9/2006 | Chowdhuri et al. |
| 2006/0230016 A1* | 10/2006 | Cunningham .... G06F 17/30474 |
| 2006/0242102 A1* | 10/2006 | Bruno ............... G06F 17/30312 |
| 2006/0294058 A1* | 12/2006 | Zabback ........... G06F 17/30536 |
| 2007/0038595 A1 | 2/2007 | Ghosh et al. |
| 2007/0038618 A1 | 2/2007 | Kosciusko et al. |
| 2007/0050330 A1* | 3/2007 | Karn ................. G06F 17/30967 |
| 2007/0061379 A1 | 3/2007 | Wong et al. |
| 2007/0078825 A1 | 4/2007 | Bornhoevd et al. |
| 2007/0083500 A1 | 4/2007 | Zibitsker |
| 2007/0136383 A1 | 6/2007 | Steinbach et al. |
| 2007/0214104 A1 | 9/2007 | Miao et al. |
| 2008/0010240 A1 | 1/2008 | Zait |
| 2008/0040196 A1 | 2/2008 | Coon et al. |
| 2008/0052271 A1 | 2/2008 | Lam |
| 2008/0077348 A1 | 3/2008 | Hildebrand et al. |
| 2008/0098003 A1 | 4/2008 | Dias et al. |
| 2008/0114718 A1 | 5/2008 | Anderson et al. |
| 2008/0126393 A1 | 5/2008 | Bossman et al. |
| 2008/0133458 A1* | 6/2008 | Zabback ........... G06F 17/30469 |
| 2008/0168058 A1 | 7/2008 | Gordon |
| 2008/0178079 A1 | 7/2008 | Chen et al. |
| 2008/0195577 A1* | 8/2008 | Fan ................... G06F 17/30469 |
| 2008/0215536 A1 | 9/2008 | Day et al. |
| 2008/0228710 A1 | 9/2008 | Muras |
| 2008/0235183 A1 | 9/2008 | Draese et al. |
| 2009/0006445 A1 | 1/2009 | Shemenzon et al. |
| 2009/0018992 A1* | 1/2009 | Zuzarte ............. G06F 17/30433 |
| 2009/0037923 A1 | 2/2009 | Smith et al. |
| 2009/0049012 A1* | 2/2009 | Bossman ........... G06F 17/30474 |
| 2009/0077016 A1 | 3/2009 | Belknap et al. |
| 2009/0077017 A1* | 3/2009 | Belknap ............ G06F 17/30306 |
| 2009/0106219 A1* | 4/2009 | Belknap ............ G06F 17/30463 |
| 2009/0216709 A1* | 8/2009 | Cheng ............... G06F 17/30442 |
| 2009/0248621 A1* | 10/2009 | Dageville ......... G06F 17/30306 |
| 2009/0327214 A1* | 12/2009 | Richardson ....... G06F 17/30469 |
| 2009/0327254 A1 | 12/2009 | Bruno et al. |
| 2010/0005340 A1 | 1/2010 | Belknap et al. |
| 2010/0106708 A1* | 4/2010 | Burger .............. G06F 17/30474 707/713 |
| 2010/0114868 A1* | 5/2010 | Beavin .............. G06F 17/30463 707/718 |
| 2012/0005189 A1* | 1/2012 | Yu .................... G06F 17/30463 707/718 |
| 2015/0317359 A1* | 11/2015 | Tran ................. G06F 17/30345 707/718 |

OTHER PUBLICATIONS

Arawal et al., "Database Tuning Advisor for Microsoft SQL Server 2005: Demo", in Proceedings of the 2005 ACM Sigmod International Conference on Management of Data, dated 2005, 3 pages.

Agrawal et al., "Automated Selection of Materialized Views and Indexex for SQL Databases", In Proceedings of the 26th International Conference on the Very Large Databases, dated 2000, 10 pages.

Gopalkrishnand, Vivikanand, et al. "Issues of Object-Relational View Design in Data Warehousing Environment," IEEE 1998, 0780347781, pp. 2732-2737.

Kung, Chenho, "Object Subclass Hierarchy in SQL: A Simple Approach," Communications of the AC, Jul. 1990, vol. 33, No. 7, pp. 117-125.

Bello, Randall G. et al. "Materialized Views in Oracle," VLDB '98, Proceedings of 24th International Conference on Very Large Data Bases, Aug. 24-27, 1998, New York City, New York, USA, pp. 659-664.

Najjar, Faiza et al. "Cardinality estimation of distributed join queries," Sep. 1-3, 1999; Database and Expert Systems Applications, 1999, Proceedings, Tenth International Workshop on, pp. 66-70.

Moro, Gianluca et al. "Incremental maintenance of multi-source views," Database Conference, 2001, ADC 2001, Proceedings, 12th Australasian, Jan. 2001, pp. 13-20.

Ahmed, Rafi, et al., "Cost-Based Query Transformation in Oracle," Copyright 2006 VLDB, ACM 1595933859, pp. 1026-1036.

Oracle® Database Performance Tuning Guide 10g Release 2 (10.2) "Using Plan Stability" pp. 18-1 to 18-10, 10gR2 released Jul. 11, 2005.

Bergsten, et al., "Prototyping DBS3 a Shared-Memory Parallel Database System", IEEE 818622954, 226-234, 1991, pp. 226-234.

Bhide, Anupam, "An Analysis of Three Transaction Processing Architectures", Computer Science Division, UC Berkeley, Proceeding of the 14th VLDB Conference,1998, pp. 339-350.

Copeland, George et al., "Data Placement in Bubba," ACM 0897912683, 1988, pp. 99-108.

Dayal, Umeshwar, "Of Nests and Trees: A Unified Approach to Processing Queries That Contain Nested Subqueries, Aggregates and Quantifiers", Proceedings of the 13th VLDB Conference, Brighton 1987, pp. 197-208.

Dewitt, et al., "A Performance Analysis of the Gamma Database Machine," Computer Sciences Department, University of Wisconsin, 1988, pp. 350-360.

Englert, Susan et al., "A Benchmark of NonStop SQL Release 2 Demonstrating Near-Linear Speedup and Scaleup on Large Databases", Technical Report 89.4, Tandem Part No. 27469, May 1989, pp. 1-23.

Graefe, Goetz, "Encapsulation of Parallelism in the Volcano Query Processing System," Mar. 1990, pp. 102-111.

Hirano, et al., "Load Balancing Algorithm for Parallel Processing on Shared Memory Multiprocessor", IEEE, pp. 210-217, 1991.

Hong, et al., "Optimization of Parallel Query Execution Plans in XPRS", Proceedings of the First International Conference on Parallel and Distributed Information Systems, IEEE, 1991, pp. 218-225.

Leverenz et al., "Oracle 8i Concepts Release 8.1.5-A67781-01", Oracle Corporation, Feb. 1999, located on the internet at <http://www.csee.umbc.edu/help/oracle8/server.815/a67781/toc.htm>, 122 pages.

Lumpkin, George et al., "Query Optimization in Oracle 9i", Oracle Corporation, Oracle White Paper, Feb. 2002, pp. 1-30.

Pirahesh, Hamid, et al., "Extensible/Rule Base Query Rewrite Optimization in Starburst", IBM Almaden Research Center.

Selinger, P. Griffiths, et al., "Access Path Selection in a Relational Database Management System", Proceedings of the 1979 ACM SIGMOD International Conference on the Management of Data, 1979, pp. 23-34.

Stonebraker, Michael, et al. "The Design of XPRS," Proceedings of the 14th VLDB Conference, 1988, pp. 318-330.

Tandem, "A Benchmark of NonStop SQL on the Debit Credit Transaction", The Tandem Performance Group, 1988, pp. 337-341.

Borla-Salamet, Pascale, "Compiling Control into Database Queries for Parallel Execution Management," IEEE Conference on Parallel Distributed Information Systems, 1991, ISBN 0-8186-2295-4, pp. 271-279.

Chaudhuri, Surajit et al., "Including Group-By in Query Optimization," Proceedings of the 20th VLDB Conference—1994, pp. 354-366.

Galindo-Legaria, Cesar et al., "Outerjoin Simplification and Reordering for Query Optimization," ACM Transactions on Database Systems, vol. 22, No. 1, Mar. 1997, pp. 43-74.

(56) References Cited

OTHER PUBLICATIONS

Erickson, Gail et al., "Improving Performance with SQL Server 2000 Indexed Views," Microsoft TechNet, Sep. 2000, located on the internet at http://www.microsoft.com/technet/prodtechnol/sql/2000/maintain/indexvw.mspx?pf=true, retrieved on Nov. 11, 2006, 14 pages.

Mishra, Priti et al., "Join Processing in Relational Databases," ACM Computing Surveys, vol. 24, No. 1, Mar. 1992, pp. 63-113.

Seshadri, Preveen, "Cost-Based Optimization for Magic: Algebra and Implementation," SIGMOND '96, 1996 ACM 0-89791-794-4, pp. 435-446.

Deutsch, Alin et al., "Minimization and Group-By Detection for Nested XQueries", University of California, San Diego, 2003, 15 pages.

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

\* cited by examiner

202
IDENTIFY A FIRST EXECUTION PLAN THAT A DATABASE MANAGEMENT SYSTEM FORMULATES FOR PARTICULAR DATABASE STATEMENTS THAT RUN OVER PARTICULAR DATA; WHEREIN IDENTIFYING THE FIRST EXECUTION PLAN IS BASED, AT LEAST IN PART, ON A FIRST SET OF STATISTICS FOR THE PARTICULAR DATA

204
AFTER IDENTIFYING THE FIRST EXECUTION PLAN, IDENTIFY A SECOND EXECUTION PLAN THAT THE DATABASE MANAGEMENT SYSTEM FORMULATES FOR THE PARTICULAR DATABASE STATEMENTS; WHEREIN IDENTIFYING THE SECOND EXECUTION PLAN IS BASED, AT LEAST IN PART, ON A SECOND SET OF STATISTICS FOR THE PARTICULAR DATA; AND WHEREIN THE FIRST SET OF STATISTICS ARE DIFFERENT THAN THE SECOND SET OF STATISTICS

206
AUTOMATICALLY TUNE THE PARTICULAR DATABASE STATEMENTS BASED, AT LEAST IN PART, ON IDENTIFYING THE SECOND EXECUTION PLAN THAT THE DATABASE MANAGEMENT SYSTEM FORMULATES FOR THE PARTICULAR DATABASE STATEMENTS

302
GENERATE A PLURALITY OF EXECUTION PLANS FOR PARTICULAR DATABASE STATEMENTS; WHEREIN THE PLURALITY OF EXECUTION PLANS ARE BASED ON A PLURALITY OF SETS OF STATISTICS FOR PARTICULAR DATA OVER WHICH THE PARTICULAR DATABASE STATEMENTS RUN

304
GENERATE A DIAGNOSTIC VALUE FOR THE PARTICULAR DATABASE STATEMENTS BASED, AT LEAST IN PART, ON: A CHANGE BETWEEN (A) A FIRST VALUE FOR THE PARTICULAR VARIABLE ATTRIBUTE AND (B) A SECOND VALUE FOR THE PARTICULAR VARIABLE ATTRIBUTE, AND A CHANGE BETWEEN (A) A COST OF A FIRST EXECUTION PLAN, OF THE PLURALITY OF EXECUTION PLANS, THAT IS GENERATED BASED ON THE FIRST SET OF STATISTICS AND (B) A COST OF A SECOND EXECUTION PLAN, OF THE PLURALITY OF EXECUTION PLANS, THAT IS GENERATED BASED ON THE SECOND SET OF STATISTICS

306
IN RESPONSE TO DETERMINING THAT THE DIAGNOSTIC VALUE EXCEEDS A PARTICULAR THRESHOLD, PERFORM ONE OR MORE OF A SET OF ACTIONS COMPRISING: AUTOMATICALLY TUNING THE PARTICULAR DATABASE STATEMENTS, AND INCLUDING INFORMATION FOR THE PARTICULAR DATABASE STATEMENTS IN A REPORT SET OF INFORMATION

FIG. 4

| DATABASE STATEMENTS 410 | 1.2X (420) | 1.5X (422) | 2X (424) | 3X (426) | 4X (428) |
|---|---|---|---|---|---|
| A | 1 | 1 | 1 | 1 | 1 |
| B | 1 | 2 | 2 | 2 | 2 |
| C | 2 | 1.5 | 1.5 | 3 | 2 |
| D | 1 | 1 | 1 | 1.4 | 5 |
| E | 1 | 1.3 | 1.5 | 2 | 2 |

400

IDENTIFYING HIGH RISK DATABASE STATEMENTS IN CHANGING DATABASE ENVIRONMENTS

CROSS-REFERENCE TO RELATED APPLICATIONS

This application is related to application Ser. No. 12/188,975, filed Aug. 8, 2008, titled "Fully Automated SQL Tuning" and referred to herein as the "Auto-Tuning Application", the entire contents of which is hereby incorporated by reference as if fully set forth herein.

FIELD OF THE INVENTION

The present invention relates to identifying and automatically tuning database statements for which an established execution plan is at risk of changing given adjusted statistics for a body of data over which the database statements run.

BACKGROUND

Performance of database statements, such as SQL statements, is a critical component of the overall performance of a database system. Although database applications are tested and verified before delivery to customers, the performance of database statements in the database applications is difficult to predict. Every time a database statement is executed, a different execution plan may be generated by the query optimizer, e.g., based on attributes of the data being processed by the database statements. Such variations in generated execution plans can be exacerbated in environments where attributes of the data being processed fluctuate. It is possible that a new execution plan selected to implement the database statements by the query optimizer is one that has not been tested before and one whose performance has not been analyzed and verified. Should the query optimizer choose a plan that does not give the best performance, performance of the system as a whole may suffer.

It can be difficult to identify database statements for which the query optimizer is likely to change execution plans ("high-risk database statements") prior to the database system experiencing deteriorated system performance because of sub-optimal execution plans. A database administrator may manually review database statements for a database application to identify potentially high-risk database statements. However, such a review can be costly, and generally requires expertise in query optimization, information access design, database statement design, etc.

Further, potentially high-risk database statements may be identified once a query optimizer has selected a sub-optimal execution plan to implement the database statements, which causes database system performance deterioration. However, allowing such deterioration events to occur can reduce the quality of service to customers of the database system.

Thus, there is a need for an automated process for identifying potentially high-risk database statements and taking proactive measures to minimize database system performance deterioration caused by sub-optimal execution plans.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for performing at least part of a particular series of experiments for particular database statements, and, based on the result of the experiments, automatically tuning the particular database statements.

FIG. 3 depicts a flowchart for calculating diagnostic values for database statements based on variable attribute values, used during variable attribute experiments, and resulting execution plan cost, and also mitigating risk identified using the diagnostic values.

FIG. 4 depicts a chart indicating diagnostic values calculated based on the indicated variable attribute values.

DETAILED DESCRIPTION

Figure 1:
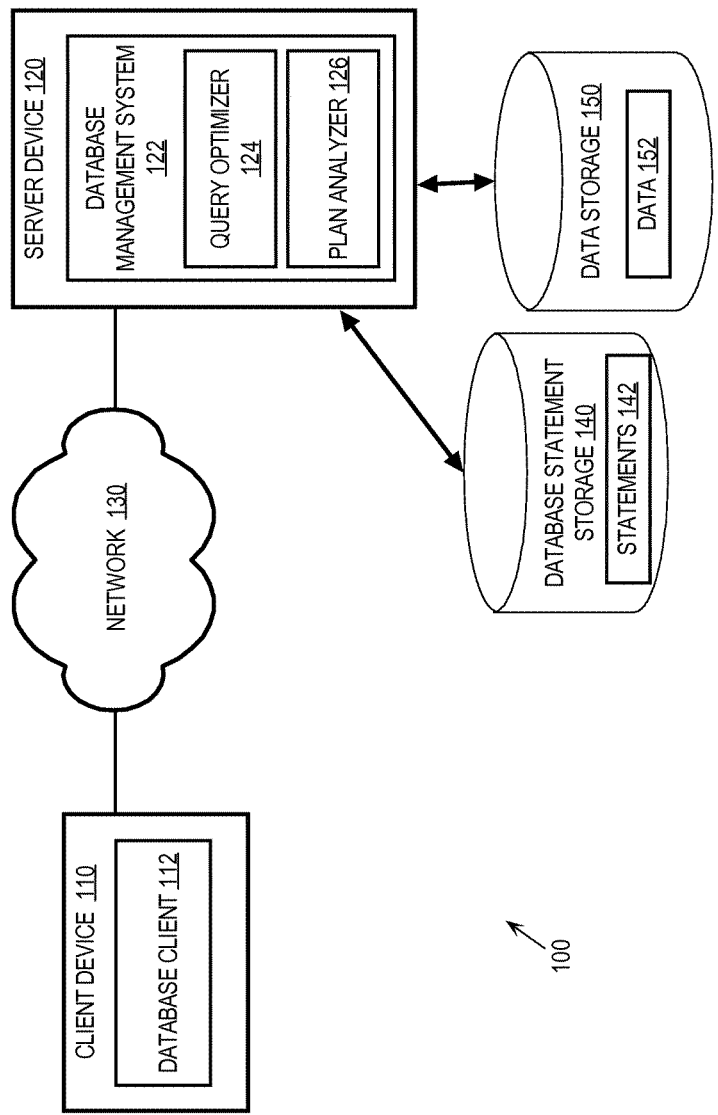
FIG. 1 is a block diagram that depicts an example network arrangement for automatically identifying and mitigating risk for high-risk database statements.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

GENERAL OVERVIEW

Techniques are described hereafter for identifying high-risk database statements, described as "high-risk" because the established execution plans for these database statements are at a high risk of changing given changing values for statistics describing data over which the database statements are run. Embodiments include identifying and mitigating risk for database statements—for relational, object-oriented, or Hadoop databases (etc.)—of any data manipulation language, such as Structured Query Language (SQL), APEX DML, HIVE SQL, etc. Specifically, to identify whether particular database statements are high-risk, a database management system performs a series of experiments for the particular database statements by generating sets of statistics describing data over which the particular database statements run. Each set of statistics includes a different value for at least a particular attribute of the data. The database management system submits each of these sets of statistics to the database query optimizer, which returns information for an execution plan that the query optimizer would use to implement the particular database statements given the submitted set of data statistics.

If the database management system determines that the query optimizer changes the established execution plan for the particular database statements in connection with any of the submitted sets of statistics, the database management system performs one or more actions to mitigate the risk of changing execution plans. For example, in response to identifying high-risk database statements, the database management system automatically tunes the high-risk database statements, and/or sends information about the high-risk database statements to a database administrator.

Techniques are also described for calculating diagnostic values, called Plan Sensitivity Index (PSI) values, based on the results of variable attribute experiments. PSI values quantify the sensitivity of the execution plans to changes in attribute values for data statistics, and may be used to quickly evaluate whether the database statements for which the PSI values are calculated are high-risk database statements. Furthermore, PSI summary values are described, which summarize PSI value information calculated for database statements in a particular group of database statements (such as the database statements used to implement a particular database application). PSI summary values are used to quickly communicate the vulnerability of groups of database statements to database administrators.

Database Statement Risk Identification Architecture

FIG. 1 is a block diagram that depicts an example network arrangement 100 for automatically identifying and mitigating risk for high-risk database statements, according to embodiments. Network arrangement 100 includes a client device 110 and a server device 120 communicatively coupled via a network 130. Server device 120 is also communicatively coupled to database statement storage 140 and data storage 150. Example network arrangement 100 may include other devices, including client devices, server devices, and display devices, according to embodiments. For example, one or more of the functions attributed to server device 120 herein may be performed by services on other server devices that are communicatively coupled to network 130.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a database client 112. Database client 112 may be implemented in any number of ways, including as a stand-alone application running on client device 110, or as a plugin to a browser running at client device 110, etc. Database client 112 may be implemented by one or more logical modules. Client device 110 may be configured with other mechanisms, processes and functionalities, depending upon a particular implementation.

Network 130 may be implemented with any type of medium and/or mechanism that facilitates the exchange of information between client device 110 and server device 120. Furthermore, network 130 may facilitate use of any type of communications protocol, and may be secured or unsecured, depending upon the requirements of a particular embodiment.

Server device 120 may be implemented by any type of computing device that is capable of communicating with client device 110 over network 130. In network arrangement 100, server device 120 is configured with a database management system (DBMS) 122. DBMS 122 includes a query optimizer 124 and a plan analyzer 126. Any of the functionality attributed to DBMS 122 herein may be performed by another logical entity running on server device 120 or on another device, such as database client 112, according to embodiments. DBMS 122 may be implemented by one or more logical modules, and is described in further detail below. Server device 120 may be configured with other mechanisms, processes and functionalities, depending upon a particular implementation.

Server device 120 is communicatively coupled to database statement storage 140 and to data storage 150. Database statement storage 140 and data storage 150 may variously reside in any type of storage, including volatile and non-volatile storage (e.g., random access memory (RAM), one or more hard disks, main memory, etc.), and may be implemented separately or jointly by one or more logical databases managed by DBMS 122. The storage on which database statement storage 140 and/or data storage 150 reside may be external or internal to server device 120.

Database client 112 and/or DBMS 122 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 130. Further, database client 112 and/or DBMS 122 may send one or more communications, using any of the above protocols or any other communication protocol, over network 130 to one of the other entities communicatively coupled to network 130, according to embodiments.

In an embodiment, each of the processes described in connection with database client 112 and/or DBMS 122 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Management System

DBMS 122 manages one or more databases that organize data stored at data storage 150. DBMS 122 also manages one or more applications, comprised of database statements stored at database statement storage 140, that perform data manipulation on the data in the one or more databases.

When DBMS 122 receives a client request for information from data storage 150, DBMS 122 causes the appropriate application to run over the data in data storage 150 and returns the result from running the application. For example, DBMS 122 receives, from database client 112, a particular request for at least a portion of data 152 stored at data storage 150. DBMS 122 causes an application that is configured to fulfill the particular request to run over data 152. This application is composed of database statements 142, which are stored at database statement storage 140.

Database statements 142 embody instructions to access and manipulate data 152, which instructions may be carried out in a variety of ways. To determine the manner in which database statements 142 will be carried out, query optimizer 124 provides an execution plan to implement database statements 142. An execution plan enumerates database operations to access and manipulate data 152, and also indicates the order in which those operations should be taken.

Query optimizer 124 assigns a cost to execution plans that it generates, where the cost of an execution plan represents the estimated resource usage for that plan. Query optimizer 124 bases the cost of an execution plan for database statements 142, at least in part, on statistics that describe data 152 over which database statements 142 run. DBMS 122 gathers such statistics for data 152, which statistics include one or more of: the size of the data table(s) holding data 152, data distribution (e.g., Normal, Poisson, etc.), number of rows in data tables, number of columns in data tables, number of bytes of data 152 (i.e., data volume), size of an index for data 152, etc. While it would be advantageous to have statistics for data 152 current at all times, continual statistics gathering would be costly and reduce the responsiveness of DBMS 122. Thus, generally, DBMS 122 gathers statistics for data 152 periodically, e.g., once a week, once every 18 hours, etc.

When query optimizer 124 generates multiple execution plans for particular database statements, the query optimizer selects a particular execution plan to implement the database statements based, at least in part, on the costs of each plan. According to an embodiment, query optimizer 124 selects the execution plan that has the lowest cost, among the multiple generated execution plans, to implement the database statements.

A change in the statistics describing data over which database statements run can affect the costs of execution plans designed to implement the database statements. For example, query optimizer 124 has identified a first execution plan to implement database statements 142 because the first execution plan has the lowest cost among a set of execution plans designed to implement database statements 142. Thus, DBMS 122 implements database statements 142 using the first execution plan.

While the first execution plan is being used to implement database statements 142, DBMS 122 gathers new statistics for data 152 over which database statements 142 run. At least one attribute value in the newly gathered statistics for data 152 is different than the corresponding attribute value(s) in the previous set of statistics gathered for data 152. For example, one attribute of data 152 that may fluctuate is data volume. Data volume fluctuation for data 152 is an increase or decrease of the amount of data 152 stored in data storage 150. To illustrate fluctuating data volume, data 152 represents client product orders that need to be fulfilled, the volume of which fluctuates daily as the orders are received and added to data storage 150 and also processed and removed from data storage 150. In addition to normal daily fluctuations, the volume of orders stored at data storage 150 may increase and decrease relatively dramatically, e.g., as a result of a sale or holiday season that generates more orders than normal. Such fluctuations may be captured across sets of statistics that DBMS 122 gathers for data 152.

Based on the newly gathered statistics for data 152, query optimizer 124 adjusts the costs of the execution plans designed to implement database statements 142. Based on the newly adjusted execution plan costs, query optimizer 124 determines that a second execution plan of the set of execution plans designed to implement database statements 142 has the lowest cost relative to the other execution plans. As a result, query optimizer 124 identifies the second execution plan, rather than the first execution plan, to implement database statements 142 because the second execution plan now has the lowest cost. Subsequently, DBMS 122 implements database statements 142 using the second execution plan.

Any change of the execution plan used to implement database statements introduces uncertainty to the performance the database. Generally, when a database is accessible to clients, database administrators do not tolerate uncertainty in database execution because, if an execution plan that is automatically selected by query optimizer 124 implements the database statements sub-optimally, client experience with the database deteriorates.

Conducting Experiments to Identify and Mitigate the Risk of Execution Plan Change According to embodiments, DBMS 122 identifies high-risk database statements, the execution plan for which is at risk of changing based on fluctuating statistics for data on which the database statements operate. According to an embodiment, plan analyzer 126 conducts a series of variable attribute experiments to identify data attribute values (i.e., in the statistics for the data) that would cause query optimizer 124 to change the execution plan used to implement particular database statements, such as database statements 142.

To conduct a particular series of experiments for database statements 142, plan analyzer 126 generates a group of two or more sets of statistics, where each set of statistics in the group describes particular data over which database statements 142 run, i.e., data 152. Each set of statistics in the group includes a different value for at least a particular variable attribute, e.g., to cover a range of values for the variable attribute. According to a non-limiting embodiment, there is only one variable attribute among the sets of statistics in a particular group. According to a further embodiment, a particular group of sets of statistics includes two or more variable attributes. A variable attribute may be any attribute included in data statistics gathered by DBMS 122, such as: data volume, index size, clustering factor, data distribution, #distinct values, or any database system environmental change, such as adding, dropping or rebuilding indexes, that impacts the variable attributes and potentially query performance, or any other data characteristic.

At least some of the variable attribute values among a group of sets of statistics describing data 152 are hypothetical. A hypothetical value for a variable attribute does not reflect the value of the corresponding attribute in the actual state of the statistics for data 152. Any attribute value in a set of statistics that is not hypothetical is a value from (or derived from) the actual state of the statistics for the data that the set of statistics describes. The actual state of the statistics for particular data, such as data 152, may be the state of the statistics as represented by the most current statistics that DBMS 122 has gathered for the data, or may comprise statistics that describe the data at a particular point in time (e.g., real time), etc.

According to an embodiment, the hypothetical values generated for a variable attribute are based on the actual state of statistics for data 152. For example, plan analyzer 126 generates a group of five sets of statistics with the following values for a variable attribute in the group (where 'X' represents the value of the variable attribute in the actual state of the statistics for data 152): 1.2X; 1.5X; 2X; 3X; and 4X, where the multipliers for the values may be based on configuration information from database administrators. Also, according to an embodiment, one or more aspects of a series of experiments are automatically determined by DBMS 122.

DBMS 122 performs a series of experiments for database statements 142 when plan analyzer 126 submits each set of statistics of a group of sets of statistics to query optimizer 124. In response to submission of these sets of statistics to query optimizer 124, query optimizer 124 returns information for execution plans that would be selected to implement database statements 142 based on the submitted statistics, as described below. Thus, a series of experiments tests whether variation in at least one variable attribute value for particular data may cause the execution plan to change for the database statements that run over the particular data.

FIG. 2 depicts a flowchart 200 for performing at least part of a particular series of experiments for particular database statements, and, based on the result of the experiments, automatically tuning the particular database statements. At step 202 of flowchart 200, a first execution plan that a database management system generates for particular database statements that run over particular data is identified, wherein identifying the first execution plan is based, at least in part, on a first set of statistics for the particular data.

For example, plan analyzer 126 generates a first set of statistics as part of a group of sets of statistics to submit to query optimizer 124, where the variable attribute for the group of sets of statistics is data volume. This first set of statistics includes a data volume attribute value of 100 Mbytes. According to an embodiment, the variable attribute value in the first set of statistics is a hypothetical value that does not reflect the actual state of the statistics for data 152. For example, the actual state of the data volume statistic for data 152 is 50 Mbytes, and thus, the data volume of 100 Mbytes indicated in the first set of statistics is a hypothetical value. According to another embodiment, the variable attribute value in the first set of statistics is the value of the variable attribute value from the actual state of the statistics for data 152.

Plan analyzer 126 sends a request to query optimizer 124 to provide first execution plan information for an execution plan that query optimizer 124 would select to implement database statements 142 given the first set of statistics for data 152 over which database statements 142 run. Query optimizer 124 returns, to plan analyzer 126, first information for an execution plan that query optimizer 124 would select to implement database statements 142 given the first set of statistics for data 152.

At step 204, after identifying the first execution plan, a second execution plan that the database management system generates for the particular database statements is identified, wherein identifying the second execution plan is based, at least in part, on a second set of statistics for the particular data, and wherein the first set of statistics are different than the second set of statistics. For example, plan analyzer 126 generates a second set of statistics as part of the group of sets of statistics that includes the first set of statistics. As such, the second set of statistics includes all of the same attribute values as the first set of statistics except for the variable attribute value. Continuing with the example given above, the second set of statistics indicates that data 152 has a volume of 200 Mbytes. The second set of statistics are different than the first set of statistics such that at least one attribute value in the second set of statistics is different than a corresponding attribute value in the first set of statistics (i.e., the variable attribute values).

According to an embodiment, the second set of statistics includes at least one hypothetical value that does not reflect the actual state of the statistics for data 152. For example, the data volume of 200 Mbytes indicated in the second set of statistics is a hypothetical value given that the actual state of the data volume statistic for data 152 is 50 Mbytes. In this embodiment, the hypothetical value in the second set of statistics is the value of the variable attribute.

To further illustrate, after receiving information from query optimizer 124 for the first execution plan based on the first set of statistics for data 152, plan analyzer 126 sends a second request to query optimizer 124 to provide second execution plan information for an execution plan that query optimizer 124 would select to implement database statements 142 given the second set of statistics for data 152. Query optimizer 124 returns, to plan analyzer 126, second information for an execution plan that query optimizer 124 would select to implement database statements 142 given the second set of statistics for data 152.

In the one or more embodiments where the first and/or second set of statistics includes at least one hypothetical value, the request to query optimizer 124 does not require DBMS 122 to replace an execution plan that is currently implementing database statements 142 with any execution plan that is selected to implement database statements 142 based on the provided statistics. For example, a particular variable attribute experiment requests information from query optimizer 124 in Explain Plan mode. Thus, variable attribute experiments do not take up significant amounts of processing power and may be run while the database is available for clients to use (i.e., while the database is in production mode).

Mitigating the Risk

According to an embodiment, when the results of a series variable attribute experiments indicate that there is a risk of a change in the execution plan implementing database statements 142 based on fluctuating statistics for data 152, DBMS 122 identifies database statements 142 to be high-risk database statements and performs one or more actions to mitigate the risk. According to a further embodiment, performing risk mitigation is also based on additional risk factors indicated below.

DBMS 122 performs one or more of the following to mitigate the risk associated with high-risk database statements:
- auto-tune the high-risk database statements;
- auto-tune a workload that includes the high-risk database statements;
- identify a profile for the high-risk database statements (e.g., using SQL Profile);
- identify a plan baseline for the high-risk database statements (e.g., using SQL Plan Baseline);
- track information about the high-risk database statements (e.g., in database statement storage 140) such as one or more of:
  - profile information,
  - plan baseline information,
  - current execution plan information,
  - information for the new execution plan identified for the high-risk database statements via the variable attribute experiments;
- add identifying information for the high-risk database statements to a list of database statements that may potentially need mitigating action, e.g., if no other action is currently appropriate for the identified high-risk database statements;
- send information about the high-risk database statements to a database administrator;
- etc.

Returning to flowchart 200, at step 206, in response to detecting that the second execution plan is different than the first execution plan, the particular database statements are automatically tuned. For example, plan analyzer 126 determines that the second execution plan information returned by query optimizer 124 reflects a different execution plan than the first execution plan information returned by query optimizer 124. Thus, query optimizer 124 would implement a different execution plan for database statements 142 given the change in attribute values reflected between the first and second sets of statistics.

According to an embodiment, execution plans for particular database statements are different when the cost difference between the execution plans exceed a configurable threshold, such as 5 cost units. In this embodiment, execution plans are not different based solely on varying operations for implementing the database statements. According to another embodiment, execution plans for particular database statements are different when the execution plans indicate different operations and/or a different ordering of operations for implementing the database statements.

In response to determining that the execution plan would change, DBMS 122 to auto-tunes database statements 142. According to an embodiment, DBMS 122 auto-tunes high-risk database statements by automatically performing one or more aspects of the fully-automated process for tuning database query language statements described in the Auto-Tuning Application incorporated by reference above. To auto-tune database statements, DBMS 122 performs one or more of the following steps, described in more detail in the Auto-Tuning Application:

(1) tune the identified database statements to generate tuning recommendations for the database statements;
(2) test the recommendations and gather data about the performance of the database statements with the tuning recommendations incorporated;
(3) implement the tuning recommendations that meet certain performance improvement and/or confidence criteria; and/or
(4) monitor the database system after implementation of the tuning recommendations to measure the performance of database statements for which tuning recommendations have been implemented.

According to a further embodiment, DBMS 122 auto-tunes a workload that includes high-risk database statements. For example, DBMS 122 takes the high-risk database statements as input and performs comprehensive access structure analysis on a workload that includes the high-risk database statements. Such a comprehensive access structure analysis accounts for the cost of creating and maintaining indexes and/or materialized views. The analysis also identifies query performance/benefit tradeoff.

According to an embodiment, after DBMS 122 auto-tunes database statements 142, plan analyzer 126 performs a second series of variable attribute experiments for database statements 142 to determine whether database statements 142 are still high-risk database statements. For example, plan analyzer 126 generates a second group of sets of statistics with the same one or more variable attributes as the group of sets of statistics used in the series of experiments that identified the change in execution plan for database statements 142 that precipitated auto-tuning the database statements. Plan analyzer 126 automatically sets the values of the variable attribute in the second group of sets of statistics to include at least the value of the variable statistic at which plan analyzer 126 identified a change in execution plan. The results of this second series of experiments may be recorded by DBMS 122, and/or provided to a database administrator.

Identifying the Point at which Execution Plans Change

It may be advantageous to identify the variable attribute value at which an execution plan changes with more precision than is ascertained based on a first series of experiments. To illustrate, a first series of experiments involves a group of five sets of statistics with the following values for a variable attribute in the group: 1.2X; 1.5X; 2X; 3X; and 4X. If plan analyzer 126 identifies different execution plans based on the variable attribute value 2X and the variable attribute value 3X, then plan analyzer 126 identifies 3X to be the point at which the execution plan changes. However, the exact variable attribute value at which the execution plans change could be any point greater than 2X and less than or equal to 3X.

In order to ascertain the variable attribute value at which the execution plan for database statements 142 changes with greater precision, plan analyzer 126 performs further variable attribute experiments using the same variable attribute as the experiments that initially identified a change in execution plan. According to an embodiment, the further experiments are part of the same series of experiments as the experiments performed using the first group of sets of statistics. According to another embodiment, the further experiments are considered to be in the same series of experiments as the experiments that initially identified a change in execution plan.

For example, after plan analyzer 126 identifies a change in the execution plan for database statements 142 between an experiment using a first set of statistics and an experiment using a second set of statistics, plan analyzer 126 generates a second group of sets of statistics with the same variable attribute (e.g., data volume) as the first and second sets of statistics. The variable attribute values for the second group fall between the value for the variable attribute in the first set of statistics and the value for the variable attribute in the second set of statistics. Thus, if the first set of statistics includes 400 Mbytes as the value of the data volume attribute and the second set of statistics includes 800 Mbytes as the value of the data volume attribute, then the second group of sets of statistics include values for the data volume attribute that range between 400 Mbytes and 800 Mbytes.

Plan analyzer 126 performs further experiments for database statements 142 using the second group of sets of statistics. Specifically, plan analyzer 126 submits, to query optimizer 124, requests for execution plans based on each of the second group of sets of statistics. To illustrate, in response to a request for an execution plan based on a first set of statistics that includes 500 Mbytes as the value of the data volume attribute, query optimizer 124 returns information for an execution plan that is at least substantially similar to the execution plan returned in connection the data volume attribute of 400 Mbytes. According to an embodiment, execution plans are substantially similar when the costs of the execution plans are within a configurable threshold amount of each other, e.g., within 2 cost units. In this embodiment, any differences between the steps of the execution plans do not significantly vary the cost of the execution plans. According to another embodiment, execution plans are substantially similar when the operations indicated in the execution plans are the same.

In response to a second request for an execution plan based on a second set of statistics that includes 550 Mbytes as the value of the data volume attribute, query optimizer 124 returns information for an execution plan that is at least substantially similar to the execution plan returned in connection the data volume attribute of 800 Mbytes. Thus, plan analyzer 126 determines that the execution plan for database statements 142 would change at some data volume attribute that is greater than 500 Mbytes and less than or equal to 550 Mbytes. According to an embodiment, plan analyzer 126 identifies the range of variable attribute values over which the execution plan may possibly change as the point at which the execution plan changes. According to another embodiment, plan analyzer 126 identifies the variable attribute value at which query optimizer 124 reports a changed execution plan (i.e., 550 Mbytes) to be the point at which the execution plan changes, which variable attribute value is referred to herein as the "key variable attribute value".

According to an embodiment, DBMS 122 records and/or communicates to a database administrator the identified point at which the execution plan for database statements 142 changes. Furthermore, the more precise information about the point at which the execution plan for database statements 142 changes may be used in connection with the additional risk factors described below.

Additional Risk Factors

Historical information indicating past statistics that DBMS 122 has gathered for data 152 may be used to inform how likely an identified potential change in execution plan for database statements 142 is to occur, e.g., during a particular future time period such as within the next 30 or 90 days. More specifically, according to an embodiment, plan analyzer 126 determines from historical information for data 152 how likely it is that data 152 will attain the key variable attribute value. Such a determination may be based on historical fluctuation in the values of the one or more variable attributes of the experiments for database statements 142, etc. For example, based on statistics for data 152 gathered over the last 90 days, DBMS 122 determines that it is only 8% likely that the volume of data 152 will reach 550 Mbytes in the next 30 days.

As a further example, based on statistics gathered for data 152 over 30 days, DBMS 122 determines that, at the end of the 30 days, the size of a particular table in data 152 is five times the size of the particular table at the beginning of the 30 days. As such, DBMS 122 identifies four times growth of the table in 30 days. According to an embodiment, DBMS 122 performs linear extrapolation to predict when the size of the table will attain identified PSI values at current growth rates measured from the historical statistics. According to a further embodiment, DBMS 122 performs curve fitting based on current data distribution (Normal, Poisson, etc.), to extrapolate beyond a curve indicated by historical statistics to identify when the size of the table will attain identified PSI values, at current growth rates, with a certain degree of confidence, e.g., 90%.

According to an embodiment, DBMS 122 uses the determined likelihood that data 152 will attain the key variable attribute value, e.g., in the next 30 days, as a factor in determining whether DBMS 122 performs auto-tuning on database statements 142. In this embodiment, DBMS 122 determines whether the identified likelihood that data 152 will attain the key variable attribute value (e.g., within 30 days) exceeds a particular threshold.

For example, DBMS 122 includes a rule indicating that database statements are auto-tuned when (a) variable attribute experiments identify that the database statements are high-risk database statements and (b) the likelihood of the body of data over which the database statements run will attain the key variable attribute value within the next 30 days is 5% or greater. Based on this rule, in light of the facts in the above illustration, DBMS 122 performs auto-tuning of database statements 142, since they have been identified by plan analyzer 126 as high risk, and the likelihood of the volume of data 152 reaching 550 Mbytes in the next month exceeds the threshold of 5%. However, if the threshold in the rule is 10%, then DBMS 122 does not perform auto-tuning on database statements 142 because the likelihood of the volume of data 152 reaching 550 Mbytes in the next month does not exceed the threshold of 10%.

Also, according to an embodiment, DBMS 122 sends to a database administrator information about the likelihood that the data 152 will attain the key variable attribute value within the given time period. Such information may be used by the administrator to identify how to address changing execution plans.

Historical information indicating past statistics that DBMS 122 has gathered for data 152 may also be useful to identify whether database statements 142 should be subject to variable attribute experiments in the first place, or to identify what variable attribute should be used for variable attribute experiments for database statements 142. According to an embodiment, if historical information for data 152 indicates a likelihood that the volume of data 152 is likely to grow to unprecedented levels, such information causes DBMS 122 to perform variable attribute experiments for database statements 142 (that run over data 152) with a variable attribute of data volume.

According to a further embodiment, a database administrator provides information instructing DBMS 122 regarding which database applications or sub-groups of database statements are to be subjected to variable attribute experiments. A sub-group of database statement is a group of database statements, generally smaller than a database application, that perform a particular function, such as a particular query. According to an embodiment, sub-group of database statements are implemented by a single execution plan. Generally, a database application is composed of many sub-groups of database statements. A database administrator may indicate that DBMS 122 should run variable attribute experiments, e.g., for all database applications in database statement storage 140, for a particular subset of database applications in database statement storage 140, for database applications in database statement storage 140 with a particular attribute (such as database applications that run over a particular body of data), etc.

Auto-Tuning Database Statements Based on a Lack of Change of Execution Plan

It may also be beneficial for DBMS 122 to take risk-mitigating actions for database statements for which the execution plans do not change in circumstances under which the execution plans likely should change. For example, if the distribution of data 152 changes significantly, e.g., from Normal to Poisson, it is likely that the execution plan for database statements 142 (that run over data 152) should change. As a further example, if the distribution of data 152 changes but overall statistics for data 152, e.g, size of one or more tables in data 152, #unique keys, etc., remain the same, then it is possible that the statistics for data 152 are stale and there is a possibility that the execution plan for database statements 142 (that run over data 152) should change.

Database administrators may provide DBMS 122 with a list of data distribution changes that are significant changes. Significant changes may occur in connection with data volume, #unique values in a table column, frequency of unique values in a table column, the velocity of the change of unique values across the domain, in which part of the domain or band the velocity changes, etc. Thus, the list of significant changes may include information indicating a situation where DBMS 122 does not have partition level statistics for a particular table, but only has high-level table level statistics for the particular table, and a large volume of data with few distinct values have been added in a new partition of that particular table while rest of the partitions of that particular table have many distinct values. The table-level statistics for the particular table may not accurately reflect data in the partition that was added to the particular table. Such a change may precipitate a drop in the tail of the distribution of data 152 in terms of #unique keys and how many times the #unique keys occur in data 152.

According to an embodiment, when DBMS 122 determines that the distribution of data 152 has changed in a way that is included in the list of significant data distribution changes, DBMS 122 automatically causes plan analyzer 126 to run variable attribute experiments on database statements 142 to assess whether the execution plan changes appropriately for the database statements.

If DBMS 122 detects no change of execution plan for database statements 142 from the experiments run on database statements 142 after the data distribution of data 152 has changed, then DBMS 122 flags database statements 142 as potentially problematic because of the lack of change of execution plan despite the shift in data distribution. In response to flagging database statements 142 as potentially problematic, DBMS 122 performs one or more of: auto-tuning database statements 142; recording information for database statements 142, i.e., in a list of potentially problematic database statements; sending information about database statements 142 to a database administrator; etc.

Plan Sensitivity Index

According to an embodiment, plan analyzer 126 calculates one or more diagnostic values, called Plan Sensitivity Index (PSI) values, for database statements 142 based on the results of variable attribute experiments run for the database statements. PSI values quantify the sensitivity of execution plans to changes in attribute values for data statistics, and may be used to quickly evaluate whether the database statements for which the PSI values are calculated are high-risk database statements. A PSI value is calculated based on the ratio of (a) the % change in execution plan cost to (b) the % change in the variable attribute value, across two or more variable attribute experiments from a series of experiments. Query optimizer 124 includes the cost of an execution plan in the information that query optimizer 124 returns about the execution plan to plan analyzer 126.

FIG. 3 depicts a flowchart 300 for calculating diagnostic values for database statements based on variable attribute values and execution plan cost, and performing one or more actions to mitigate risk identified using the diagnostic values. At step 302, a plurality of execution plans for particular database statements are generated, wherein the plurality of execution plans are based on a plurality of sets of statistics for particular data over which the particular database statements run.

For example, plan analyzer 126 generates a group of sets of statistics for data 152 with a variable attribute of data volume. The actual value of the volume statistic for data 152 is X. The group of sets of statistics includes a first set of statistics with a data volume of X, a second set of statistics with a data volume of 2X, a third set of statistics with a data volume of 4X, and a fourth set of statistics with a data volume of 5X. Plan analyzer 126 performs a series of variable attribute experiments using the generated sets of statistics. The following are results from the series of experiments:

Based on the first set of statistics, query optimizer 124 returns information for a first query execution plan with a cost of 10.

Based on the second set of statistics, query optimizer 124 returns information for a second query execution plan with a cost of 20.

Based on the third set of statistics, query optimizer 124 returns information for a third query execution plan with a cost of 60.

Based on the fourth set of statistics, query optimizer 124 returns information for a fourth query execution plan with a cost of 120.

At step 304, a diagnostic value for the particular database statements is generated based, at least in part, on: (1) a change between (a) the first value for the particular variable attribute and (b) the second value for the particular variable attribute, and (2) a change between (a) a cost of a first execution plan, of the plurality of execution plans, that is generated based on the first set of statistics and (b) a cost of a second execution plan, of the plurality of execution plans, that is generated based on the second set of statistics.

For example, plan analyzer 126 determines that the change in data volume between the first and second experiments (performed using the first and second sets of statistics) is 100%, i.e., the data volume doubled from X to 2X between the sets of statistics. Plan analyzer 126 also determines that the change in the cost from the first execution plan to the second execution plan is 100%, i.e., the execution plan cost doubled from 10 to 20. Plan analyzer 126 generates a first PSI value of 1 for database statements 142, since (100% change of execution plan cost)/(100% change in the data volume value)=1.

A PSI value of 1 indicates a linear relationship between the growth of execution plan cost and the growth of the variable attribute value across the experiments used to calculate the PSI value. A PSI value of greater than one indicates a non-linear relationship between the growth of execution plan cost and the growth of the variable attribute value across experiment results. A non-linear relationship between change in execution plan cost and change in variable attribute value may indicate that the database statements on which the experiments were run are high-risk database statements. Database performance is susceptible to deterioration when an execution plan cost raises more quickly than the change in variable attribute value.

At step 306, in response to determining that the diagnostic value exceeds a particular threshold, performing one or more of a set of actions comprising: automatically tuning the particular database statements, and including information for the particular database statements in a report set of information. For example, according to an embodiment, DBMS 122 maintains information, e.g., from a database administrator, that indicates one or more thresholds for PSI values. When calculated PSI values exceed a particular threshold of the one or more thresholds, DBMS 122 performs an action associated with the exceeded threshold.

To illustrate, DBMS 122 maintains information for a first threshold of 1.5 PSI for auto-tuning database statements. DBMS 122 also maintains information for a second threshold of 2 PSI for sending information about database statements to a database administrator. DBMS 122 further maintains information for a third threshold of 1.2 PSI for recording information for the database statements in a listing of potentially problematic database statements. Other actions may be associated with PSI thresholds, within embodiments.

According to an embodiment, the threshold for auto-tuning database statements is lower than the threshold for sending a database administrator information about the database statements, which threshold configuration allows the system to address potential issues via auto-tuning and reserves more serious issues that satisfy the higher PSI threshold for notification to database administrators. Information about database statements sent to database administrators may include information about auto-tuning performed for the database statements.

To continue illustration of step 306, plan analyzer 126 determines that the PSI value of 1 calculated for database statements 142 based on the first and second experiment results does not exceed any of the PSI thresholds maintained by DBMS 122. As such, DBMS 122 does not perform any risk-mitigating action for database statements 142 based on the first PSI value.

As a further illustration, plan analyzer 126 determines that the change in data volume between the second and third experiments (performed using the second and third sets of statistics) is 100%, i.e., the data volume doubled from 2X to 4X. Plan analyzer 126 also determines that the change in the cost from the second execution plan to the third execution plan is 200%, i.e., the execution plan cost raised from 20 to 60. Plan analyzer 126 generates a second PSI value of 2 for database statements 142, since (200% change of execution plan cost)/(100% change in the data volume value)=2.

Based on this second PSI value, DBMS 122 records information for database statements 142 in a listing of database queries (because the second PSI value for database statements 142 exceeds 1.2). DBMS 122 also auto-tunes database statements 142 (because the second PSI value for database statements 142 exceeds 1.5). However, DBMS does not send information about database statements 142 to a database administrator (because the second PSI value for database statements 142 does not exceed 2).

As yet a further illustration, plan analyzer 126 determines that the change in data volume between the third and fourth experiments (based on the third and fourth sets of statistics) is 25%, i.e., the data volume increased from 4X to 5X. Plan analyzer 126 also determines that the change in the cost from the third execution plan to the fourth execution plan is 100%, i.e., the execution plan cost doubled from 60 to 120. Plan analyzer 126 generates a third PSI value of 8 for database statements 142, since (200% change of execution plan cost)/(25% change in the data volume value)=8.

The third PSI value exceeds all three PSI value thresholds maintained at DBMS 122. As such, according to an embodiment, DBMS 122 records information for database statements 142 in a listing of database queries (because the third PSI value for database statements 142 exceeds 1.2). DBMS 122 also auto-tunes database statements 142 (because the third PSI value for database statements 142 exceeds 1.5) and sends information for database statements 142 to a database administrator (because the third PSI value for database statements 142 exceeds 2).

According to a further embodiment, DBMS 122 only performs a particular mitigating action once in response to PSI values calculated from a particular series of experiments. To illustrate this embodiment, after DBMS 122 calculates the second PSI value of 2 and performs the actions associated with thresholds that the second PSI value exceeds, DBMS 122 calculates the third PSI value of 8. While a PSI value of 8 exceeds all of the thresholds that a PSI value of 2 exceeds, DBMS 122 only performs those actions associated with thresholds that the third PSI value exceeds that the second PSI value did not exceed. In other words, in terms of the example given above, DBMS 122 only sends information for database statements 142 to a database administrator in response to calculating the third PSI value because the other actions had already been performed in response to calculating the second PSI value.

According to an embodiment, DBMS 122 calculates PSI values and performs risk-mitigating actions based on these PSI values for: every database statement in database statement storage 140, or for all database statements in database statement storage 140 that pertain to a particular database application other group of database statements (i.e., identified as grouped by a database administrator), etc.

PSI Summary Values

According to a further embodiment, DBMS 122 calculates, and reports to database administrators, PSI summary values that summarize PSI values for a group of database statements, such as for all of the database statements that are part of a particular application or group of applications. For example, DBMS 122 prepares a report for database administrators with the PSI summary values for a particular database application, and includes information for sub-groups of database statements included in the particular database application, the individual PSI values for which exceed a threshold associated with reporting information for the sub-groups of database statements to database administrators.

According to an embodiment, a PSI summary value indicates what percentage of the database statements in the applicable group of database statements have PSI values that exceed a certain threshold PSI for a given change in variable attribute value. For example, database administrators provide information to DBMS 122 indicating that the PSI summary values for a particular application, e.g., composed of all of the database statements stored in database statement storage 140, should reflect the percentage of database statements that meet or exceed 2 PSI for variable attribute experiments with variable attribute values of 1.2X, 1.5X, 2X, 3X, and 4X.

DBMS 122 performs a series of experiments with the indicated variable attribute values and calculates PSI values for each of the sub-groups of database statements in database statement storage 140 based on the results of the experiments. FIG. 4 depicts a chart 400 indicating PSI values calculated at the indicated variable attribute values for the sub-groups of database statements 410, specifically, sub-groups A, B, C, D, and E.

In the example of chart 400, the values in column 420 indicate PSI values calculated based on the change between (a) information for the currently implemented execution plan (for the indicated database statement sub-groups) with a variable attribute value of X and (b) results of variable attribute experiments with the variable attribute value 1.2X. The values in column 422 indicate PSI values calculated based on the results of variable attribute experiments with the variable attribute values 1.2X and 1.5X. The values in columns 424-428 follow in this same pattern.

Based on the PSI values in chart 400, DBMS 122 calculates PSI summary values for the database application that is composed of the sub-groups of database statements 410. At 1.2X, only one of the database statement sub-groups (C) has a PSI of at least 2, so the PSI summary value for the database application at 1.2X is 20%. At 1.5X, database statement sub-group B also reaches 2 PSI. Though database statement sub-group C is now at 1.5, it has previously reached the threshold value and is included in the count of database statements that have reached the threshold. As such, the PSI summary value for the database application at 1.5X is 40%. At 2X, the PSI summary value is still 40%, since no additional database statement sub-groups reach the threshold at that point. At 3X, the PSI summary value is 60%, since the PSI value for database statement sub-group E reaches the threshold at that point. At 4X, the PSI summary value is 80%, since database statement sub-group D has also reached the threshold PSI value.

According to another embodiment, a PSI summary value is the sum of all of the PSI values (for sub-groups of database statements pertaining to a particular group of database statements) calculated from the results of variable attribute experiments using a particular variable attribute value. In this embodiment, the PSI summary values resulting from the experiment results in chart 400 are: 1.2X: 6 PSI; 1.5X: 6.8 PSI; 2X: 7 PSI; 3X: 9.4 PSI; and 4X: 12 PSI. Alternatively, DBMS 122 subtracts 1 PSI for each applicable sub-group of database statement from the PSI summary values. In the example given above, DBMS would subtract 5 PSI from each of the calculated PSI summary values, which can illustrate to database administrators how far from linear the progression of execution plan cost is from the growth of the variable attribute value.

According to an embodiment, DBMS 122 auto-tunes a workload containing high-risk database statements in response to identifying significant changes in PSI summary values. When such significant changes are detected, then it is likely that the schema design and data access pattern for the workload should be revisited, e.g., thru partitioning objects, materialized views, etc. As a further embodiment, a report that includes PSI summary values with significant changes also includes a suggestion that a database administrator tune an appropriate database statement workload.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
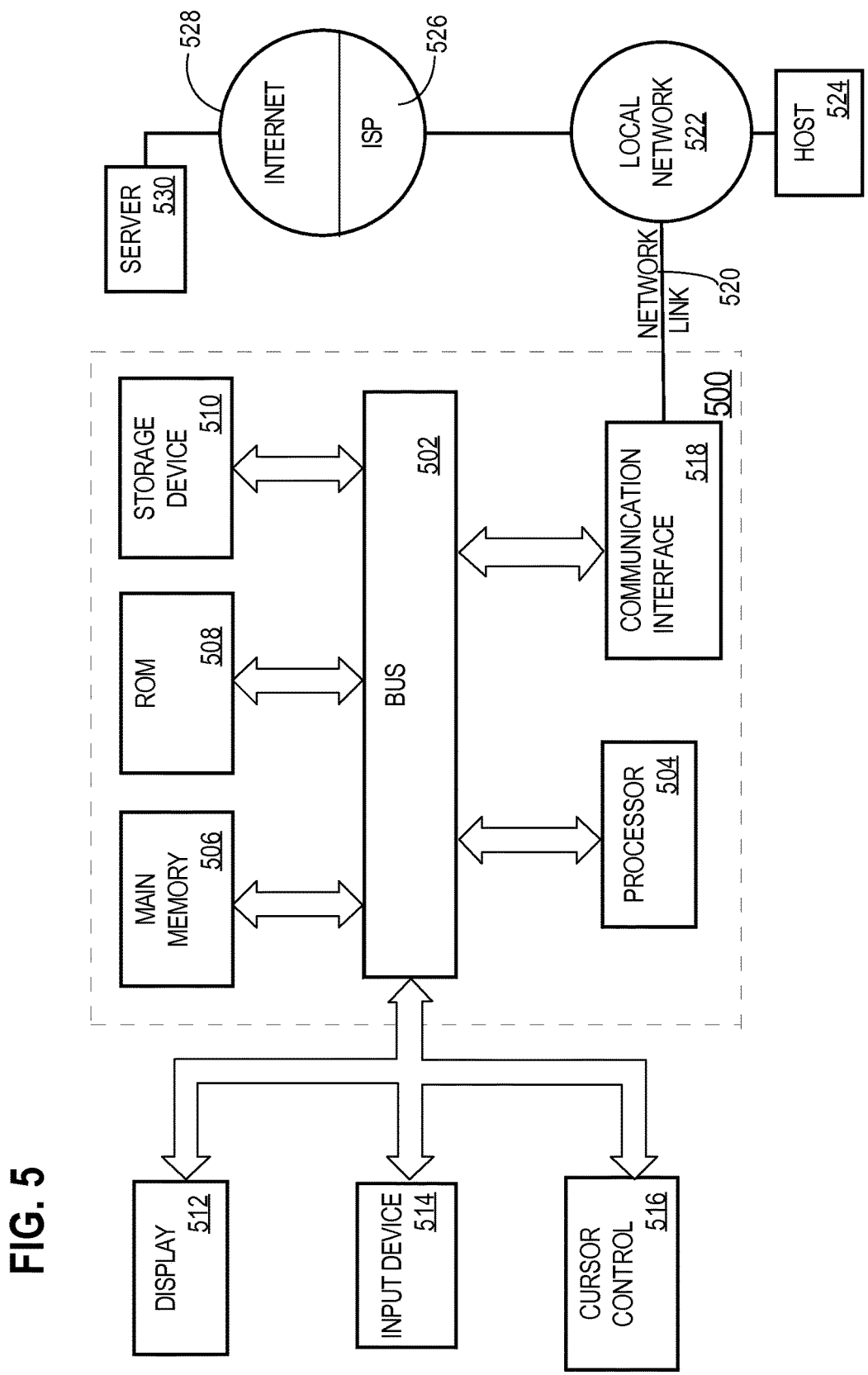
FIG. 5 is a block diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a liquid-crystal display (LCD) or a light-emitting diode (LED) display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Cloud Computing Overview

The techniques described herein are implemented using one or more processing solutions, examples of which include distributed systems, clustered computing systems, and cloud computing systems. In an embodiment, DBMS 122 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to DBMS 122, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
based, at least in part, on a first set of statistics comprising a first hypothetical value for a particular attribute of particular data in a database, said particular attribute specifying how much data is hypothetically stored in one or more particular tables or indexes in the database, identifying a first execution plan that a database management system generates for particular database statements that run over the particular data;
after identifying the first execution plan, and based, at least in part, on a second set of statistics comprising a second hypothetical value, for the particular attribute of the particular data, identifying a second execution plan that the database management system generates for the particular database statements;
wherein the first hypothetical value is different than the second hypothetical value;
in response to detecting that the second execution plan is different than the first execution plan, automatically tuning the particular database statements;
wherein the method is performed by one or more computing devices.

2. The method of claim 1, wherein:
attributes, other than the particular attribute, of the first and second sets of statistics have the same values among corresponding attributes.

3. The method of claim 1, further comprising:
determining, based at least in part on historical statistics for the particular data, a likelihood that the particular attribute of the particular data will reach, during a future time period, the second hypothetical value for the particular attribute;
wherein automatically tuning the particular database statements is further based, at least in part, on determining that the likelihood, that the particular attribute for the particular data will reach, during the future time period, the second hypothetical value for the particular attribute, exceeds a particular threshold.

4. The method of claim 1, further comprising:
in response to detecting that the second execution plan is different than the first execution plan, further performing:
generating a group of sets of statistics for the particular data;
wherein each of the sets of statistics of the group includes a different hypothetical value for the particular attribute;
wherein the hypothetical values for the particular attribute in the sets of statistics in the group fall between the first hypothetical value for the particular attribute, and the second hypothetical value for the particular attribute;
identifying a third execution plan that the database management system generates for the particular database statements based, at least in part, on a third set of statistics from the group of sets of statistics;
identifying a fourth execution plan that the database management system generates for the particular database statements based, at least in part, on a fourth set of statistics from the second group of sets of statistics; and
in response to detecting that the third execution plan is different than the fourth execution plan, automatically recording information from the group of sets of statistics.

5. The method of claim 1, wherein the database management system generates the first and second execution plans in Explain Plan mode.

6. A computer-executed method comprising:
generating a plurality of execution plans for particular database statements;
wherein the plurality of execution plans are based on a plurality of sets of statistics that characterize particular data, stored in a database, over which the particular database statements are configured to run;
wherein the plurality of execution plans includes, for each set of statistics in the plurality of sets of statistics, an execution plan that is based on the set of statistics;

wherein a first set of statistics of the plurality of sets of statistics comprises a first hypothetical value for a particular attribute;

wherein a second set of statistics of the plurality of sets of statistics comprises a second hypothetical value for the particular attribute;

wherein the first hypothetical value and the second hypothetical value are different;

generating a diagnostic value for the particular database statements based, at least in part, on:

a change between (a) the first hypothetical value for the particular attribute and (b) the second hypothetical value for the particular attribute, and a change between (a) a cost of a first execution plan, of the plurality of execution plans, that is generated based on the first set of statistics and (b) a cost of a second execution plan, of the plurality of execution plans, that is generated based on the second set of statistics; and in response to determining that the diagnostic value exceeds a particular threshold, performing one or more of a set of actions comprising:

automatically tuning the particular database statements, and including information for the particular database statements in a report set of information;

wherein the method is performed by one or more computing devices.

7. The method of claim 6, wherein the particular attribute represents volume of the particular data.

8. The method of claim 6, wherein:

the particular threshold is a first threshold;

the method further comprises:

in response to determining that the diagnostic value exceeds the first threshold, automatically tuning the particular database statements; and in response to determining that the diagnostic value exceeds a second threshold:

including information for the particular database statements in the report set of information, and sending the report set of information to a database administrator;

wherein the first threshold is lower than the second threshold.

9. One or more non-transitory computer-readable media storing one or more sequences of instructions which, when executed by one or more processors, cause:

based, at least in part, on a first set of statistics comprising a first hypothetical value for a particular attribute of particular data in a database, said particular attribute specifying how much data is hypothetically stored in one or more particular tables or indexes in the database, identifying a first execution plan that a database management system generates for particular database statements that run over the particular data;

after identifying the first execution plan, and based, at least in part, on a second set of statistics comprising a second hypothetical value, for the particular attribute of the particular data, identifying a second execution plan that the database management system generates for the particular database statements;

wherein the first hypothetical value is different than the second hypothetical value;

in response to detecting that the second execution plan is different than the first execution plan, automatically tuning the particular database statements.

10. The one or more non-transitory computer-readable media of claim 9, wherein:

attributes, other than the particular attribute, of the first and second sets of statistics have the same values among corresponding attributes.

11. The one or more non-transitory computer-readable media of claim 9, wherein the one or more sequences of instructions further comprise instructions which, when executed by one or more processors, cause:

determining, based at least in part on historical statistics for the particular data, a likelihood that the particular attribute of the particular data will reach, during a future time period, the second hypothetical value for the particular attribute;

wherein automatically tuning the particular database statements is further based, at least in part, on determining that the likelihood, that the particular attribute for the particular data will reach, during the future time period, the second hypothetical value for the particular attribute, exceeds a particular threshold.

12. The one or more non-transitory computer-readable media of claim 9, wherein the one or more sequences of instructions further comprise instructions which, when executed by one or more processors, cause:

in response to detecting that the second execution plan is different than the first execution plan, further performing:

generating a second group of sets of statistics for the particular data;

wherein each of the sets of statistics of the group includes a different hypothetical value for the particular attribute;

wherein the hypothetical values for the particular attribute in the sets of statistics in the group fall between the first hypothetical value for the particular attribute, and the second hypothetical value for the particular attribute;

identifying a third execution plan that the database management system generates for the particular database statements based, at least in part, on a third set of statistics from the group of sets of statistics;

identifying a fourth execution plan that the database management system generates for the particular database statements based, at least in part, on a fourth set of statistics from the group of sets of statistics;

in response to detecting that the third execution plan is different than the fourth execution plan, automatically recording information from the group of sets of statistics.

13. The one or more non-transitory computer-readable media of claim 9, wherein the database management system generates the first and second execution plans in Explain Plan mode.

14. One or more non-transitory computer-readable media storing one or more sequences of instructions which, when executed by one or more processors, cause:

generating a plurality of execution plans for particular database statements;

wherein the plurality of execution plans are based on a plurality of sets of statistics that characterize particular data, stored in a database, over which the particular database statements are configured to run;

wherein the plurality of execution plans includes, for each set of statistics in the plurality of sets of statistics, an execution plan that is based on the set of statistics;

wherein a first set of statistics of the plurality of sets of statistics comprises a first hypothetical value for a particular attribute;

wherein a second set of statistics of the plurality of sets of statistics comprises a second hypothetical value for the particular attribute;

wherein the first hypothetical value and the second hypothetical value are different;

generating a diagnostic value for the particular database statements based, at least in part, on:
- a change between (a) the first hypothetical value for the particular attribute and (b) the second hypothetical value for the particular attribute, and
- a change between (a) a cost of a first execution plan, of the plurality of execution plans, that is generated based on the first set of statistics and (b) a cost of a second execution plan, of the plurality of execution plans, that is generated based on the second set of statistics; and in response to determining that the diagnostic value exceeds a particular threshold, performing one or more of a set of actions comprising:
- automatically tuning the particular database statements, and
- including information for the particular database statements in a report set of information.

15. The one or more non-transitory computer-readable media of claim 14, herein the particular attribute represents volume of the particular data.

16. The one or more non-transitory computer-readable media of claim 14, wherein:

the particular threshold is a first threshold;

the one or more sequences of instructions further comprise instructions which, when executed by one or more processors, cause:
- in response to determining that the diagnostic value exceeds the first threshold, automatically tuning the particular database statements; and
- in response to determining that the diagnostic value exceeds a second threshold:
  - including information for the particular database statements in the report set of information, and
  - sending the report set of information to a database administrator;

wherein the first threshold is lower than the second threshold.

* * * * *

UNITED STATES PATENT AND TRADEMARK OFFICE
CERTIFICATE OF CORRECTION

PATENT NO. : 9,734,200 B2  
APPLICATION NO. : 14/270556  
DATED : August 15, 2017  
INVENTOR(S) : Prabhaker Gongloor et al.

Page 1 of 1

It is certified that error appears in the above-identified patent and that said Letters Patent is hereby corrected as shown below:

On the Title Page

(72) Inventors, delete "Prabhaker Gangloor, San Jose, CA" and insert --Prabhaker Gongloor, San Jose, CA--

Signed and Sealed this
Twelfth Day of June, 2018

Andrei Iancu
*Director of the United States Patent and Trademark Office*